June 6, 1939.  J. H. PLOEHN  2,161,381
WHEEL STRUCTURE
Filed Oct. 19, 1937
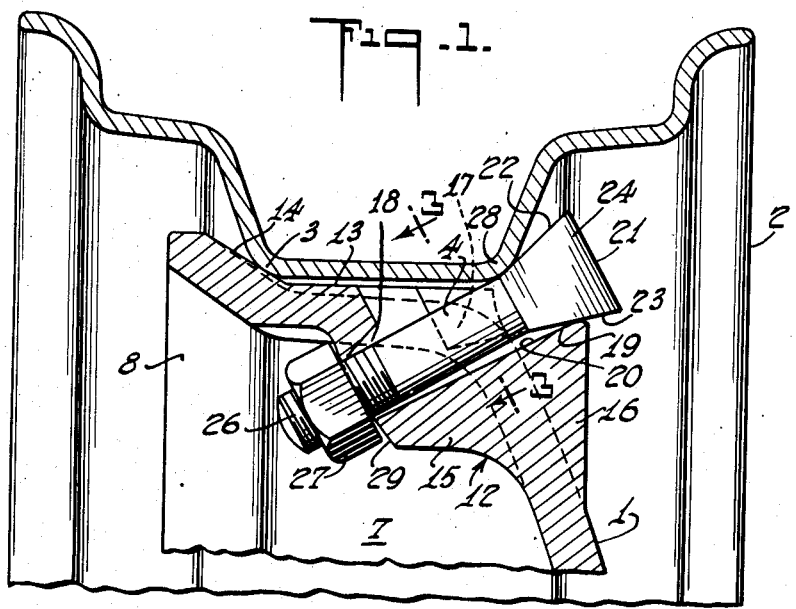
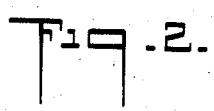
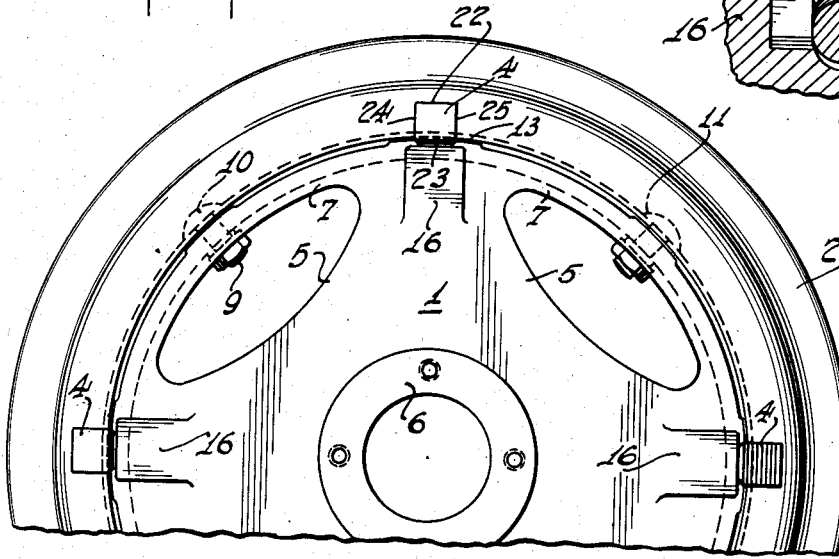
INVENTOR
John H. Ploehn
BY
Morrison, Kennedy & Campbell
ATTORNEYS.

Patented June 6, 1939

2,161,381

UNITED STATES PATENT OFFICE 2,161,381

WHEEL STRUCTURE

John H. Ploehn, Bettendorf, Iowa, assignor to French & Hecht, Incorporated, a corporation of Iowa Application October 19, 1937, Serial No. 169,755

6 Claims. (Cl. 301—20)

This invention relates to wheel structures, and more particularly to wheel structures of the demountable tire rim variety, wherein the rim is removably secured to the wheel body.

Ordinarily, in wheels of this character, the wheel body is formed with a circumferentially extending axially inclined bearing surface at one edge of the felly adapted to be engaged by a side edge of the rim, and detachable wedging means adapted to be forced between the opposite edge of the rim and the felly for centering the rim with respect to the axis of the wheel is associated with the means for securing the rim to the wheel body. Various forms of wedge and rim securing means have been proposed heretofore, of which those generally adopted for commercial use may be exemplified by the following: a wedge-shaped split ring adapted to be held in place by lugs bolted to the wheel felly; lugs adapted to be bolted to the wheel felly and formed with integral wedge portions for entering between the rim and felly; a composite unit comprising a wedge member connected to a nut which is movable relatively thereto; and, the wheel construction permitting, a nut formed with a cam surface adapted to engage the rim. The latter two forms have more or less superseded the former in recent years, mainly because fewer separate parts are employed and because of changes in wheel body design, yet, although constituting worthy advances in the art, neither has overcome the objectionable features arising from the fact that the rim engaging surface is a part (whether integral or connected) of the nut, the threads of which are easily damaged and which is frequently subjected to severe abuse in the event of its having become tight-set, rusted or otherwise fouled. Furthermore, the parts of the composite nut and wedge referred to frequently break and separate when the nut is being tightened on its bolt or subsequently during use because of stresses thereon; while in the case of the nut formed with the integral cam surface, its movement relative to the rim in engagement therewith rapidly causes a wear which destroys the cam surface.

It is the main object of the present invention to obviate these and other objectionable features and provide a demountable rim wheel structure wherein the rim securing means comprises a minimum number of separate elements and co-operates with the rim and wheel body so that there is a minimum of wear, and which means is simple and practicable both from a manufacturing and an operating standpoint.

To this end, the invention contemplates a wheel structure having a wheel body formed to support a demountable rim at one of its side edges and a plurality of rim securing members formed integrally with means for detachably anchoring them to the wheel body at spaced intervals circumferentially thereof in engagement with the opposite side edge of the rim, the members being formed with rim engaging surfaces adapted to center the rim with respect to the axis of the wheel when anchored to the wheel body. More specifically, the invention provides a wheel structure wherein a circumferential series of rim securing bolts are disposed in the wheel body at an angle to the axis of the wheel and are formed with heads having opposed oppositely bevelled surfaces adapted to wedge between the edge of the rim and lugs formed integrally with the wheel body.

In the accompanying drawing, the invention has been shown merely by way of example and in preferred form, but obviously many variations and modifications may be made therein which will still be comprised within its spirit. It is to be understood, therefore, that the invention is not limited to any specific form or embodiment except insofar as such limitations are specified in the appended claims.

Referring to the drawing:

Fig. 1 is a radial cross section of the improved wheel structure;

Fig. 2 is a side elevation of a portion of the improved wheel structure; and

Fig. 3 is a fragmentary view taken on the line 3—3 of Fig. 1, looking in the direction of the arrows.

According to a preferred embodiment of the invention, and as shown in the drawing, the wheel structure comprises a wheel body 1 on which a tire rim 2 is removably mounted, the rim being supported at one of its side edges 3 by the wheel body and at its opposite side edge by a plurality of bolts 4 anchored in the wheel body at spaced intervals circumferentially thereof.

The wheel body 1 is of the disc type comprising a disc 5 equipped with a hub 6 and having a felly 7 formed as an integral continuation of the disc extending to one side thereof and terminating in a radially extending circumferential flange 8. Driving bolts 9 are arranged at intervals circumferentially of the felly 7 to pass radially therethrough, the heads 10 of the bolts being adapted to engage in recesses 11 formed in the radially inner surface of the rim 2 to prevent circumferential movement of the rim relatively to the wheel body. At spaced intervals circumferentially of the wheel body 1, the felly 7 and contiguous portion of the disc 5 are thickened, as at 12, and formed in these localized thickened areas for the support of the rim 2.

Each thickened area 12 of the wheel body 1 is formed to provide bearing surfaces 13 and 14 extending radially slightly beyond the peripheral surface of the felly 7 and flange 8, respectively, a boss 15 on the axially inner side of the disc 5, and a lug 16 on the axially outer side of the disc 5. The bearing surface 13 extends substantially horizontally across the felly 7, while the bearing surface 14 is disposed at an angle to a plane perpendicular to the axis of the wheel and intersects the bearing surface 13 at the junction of the felly 7 and flange 8. In order to accommodate the bolt 4, the thickened portion 12 is formed throughout a part of its axial extent and intermediate its side edges to provide a recess 17 (Figs. 1 and 3) and throughout the remainder of its extent it is formed with a tapered opening 18, the radially inner walls of the recess 17 and opening 18 and the radially outer surface 19 of the lug 16 forming a continuous surface 20 disposed at an angle to the axis of the wheel, preferably an angle of 60°.

The bolt 4 is formed with a head 21 which is square in cross section and presents opposed oppositely bevelled surfaces 22, 23 and 24, 25 and the opposite end of the bolt is formed with threads 26 to receive a nut 27. The bolt 4 is adapted for anchorage in the wheel body 1 with the head 21 located between the axially outer side edge 28 of the rim 2 and the surface 19 of the lug 16 and with the nut 27, threaded on the opposite end of the bolt, engaging surface 29 of the boss 15.

In mounting the rim 2 on the wheel body 1, the rim is located to rest loosely on one or more of the bearing surfaces 13, depending upon the disposition of the wheel body at the time, the bolts 4 then inserted in place and the nuts 27 threaded on the ends of the bolts to draw the head portions 21 into engagement with the rim 2 and lugs 16. As shown in the drawing, the opposed surfaces 22 and 23 of the bolt heads 21 engage the side edge 28 of the rim 2 and the radially outer surfaces 19 of the lugs 16, respectively, and the nuts 27 bear against the surface 29 of the boss 15. Further tightening of the nuts 27 on the bolts 4 draws the latter lengthwise (toward the left in Fig. 1) and the wedging of the oppositely bevelled surfaces 22 and 23 of the bolt heads 21 between the rim 2 and lugs 16 effects a lateral and radial thrust on the rim 2, causing its edges 3 and 28 to ride up the bearing surfaces 14 and the surfaces 22 of the bolt heads 21, respectively, thus centering the rim 2 with respect to the axis of the wheel and at the same time securing it to the wheel body 1. It is pointed out that the bevelled surface 23 of the bolt head 21 engaging the surface 19 of the lug 16 causes the bolt 4 to swing radially, and this movement is permitted by the tapered opening 18.

With the foregoing arrangement, it will be seen that the bolts 4 provide unitary members for serving the two-fold purpose of centering the rim 2 with respect to the axis of the wheel and securing the rim to the wheel body. Moreover, the heads 21 of the bolts 4 which wedge between the rim 2 and lugs 16 are heavy and durable and the only force on the shanks of the bolts is the tensioning force produced by tightening the nuts 27. Furthermore, another feature of prime importance is that the only relative movement between the lugs 16 and rim 2 and the wedging surfaces of the bolt heads is that produced in effecting the wedging action by a lengthwise movement of the bolts, so that any wear will simply allow the bolts to be drawn up further and present new unworn portions of the surfaces in engagement with the rim and lugs; and, when necessary, the bolts can be located to present the other opposed surfaces 24 and 25 to effect the wedging action.

Also, the wedging surfaces can be reconditioned, if desirable, by forging the heads of the bolts and regrinding the surfaces thereof.

As already stated, a preferred embodiment of the invention has been shown and described and obviously many variations and modifications of the invention will suggest themselves to those skilled in the art. For example, the invention may be embodied as well in a fellyless wheel as in a wheel having a felly. Actually, the arrangement of the preferred embodiment is a combination of the two, since the wheel body is formed with a continuous felly portion for strength and other purposes, yet the rim supporting surfaces and securing means are localized in the thickened portions 12 of the wheel body, so that the sections of the felly intermediate the thickened portions play no direct part in the support of the rim. It is to be understood, therefore, that the invention is not limited to any specific form or embodiment except insofar as such limitations are specified in the appended claims.

Having thus described my invention, what I claim is:

1. In a wheel structure, the combination of a demountable rim, a wheel body, means formed on the wheel body to support the rim centered with respect to the axis of the wheel, a circumferential series of apertures formed in the wheel body, a plurality of rim securing members formed with tapered rim engaging portions and arranged in said apertures at an angle to the axis of the wheel, and fastening means to move the rim securing members axially and radially inward relatively to the wheel body and rim to force the rim axially and radially outward and secure it on its centering support.

2. A wheel structure according to claim 1, wherein the rim securing members are bolts having heads formed with the tapered rim engaging surfaces.

3. In a wheel structure, the combination of a demountable rim, a wheel body, means formed on the wheel body to support the rim centered with respect to the axis of the wheel, a circumferential series of bolt holes formed in the wheel body, lugs formed on one side of the wheel body adjacent the bolt holes, surfaces adjacent the bolt holes on the opposite side of the wheel body extending at an angle to the axis of the wheel and against which fastening nuts are adapted to bear, bolts arranged in the bolt holes with their longitudinal axes disposed at an angle to the axis of the wheel, said bolts being formed with heads presenting tapered rim engaging surfaces, and fastening nuts screwed on the bolts and bearing against said angularly disposed surfaces to hold the tapered bolt heads wedged between said lugs and the rim to secure the latter to its centering support.

4. A wheel structure according to claim 3, wherein the head of each of the rim securing bolts is formed with opposed oppositely tapered surfaces, one being the rim engaging surface and the other engaging the lug on the wheel body.

5. A wheel structure according to claim 3, wherein the head of each of the rim securing bolts is formed substantially square in cross-section and presents two sets of opposed oppositely tapered surfaces either set of which may be brought into use, as desired, and one surface of each set being the rim engaging surface and the other surface of the set being adapted to engage the lug on the wheel body.

6. In a wheel structure, the combination of a demountable rim, a wheel body, a rim supporting and centering member formed on the periphery of the wheel body and adapted to be engaged by the axially inner edge of the rim, a circumferential series of recesses formed in the wheel body in axially spaced relation to said rim supporting and centering member, the axially inner walls of said recesses being formed with exterior surfaces extending at an angle to the axis of the wheel, bolt holes formed in said walls, lugs formed on the axially outer side of the wheel body adjacent said recesses, bolts arranged in said bolt holes, the bolts being disposed with their longitudinal axes at an angle to the axis of the wheel and formed with heads having opposed oppositely tapered surfaces, one of said surfaces of each bolt engaging the axially outer edge of the rim and the opposite surface engaging the respective lug on the wheel body, and fastening nuts screwed on the bolts and bearing against the exterior surfaces of said axially inner walls of the recesses to wedge the bolt heads between said lugs on the wheel body and the axially outer edge of the rim and force the axially inner edge of the rim against said supporting and centering member.

JOHN H. PLOEHN.